UNITED STATES PATENT OFFICE.

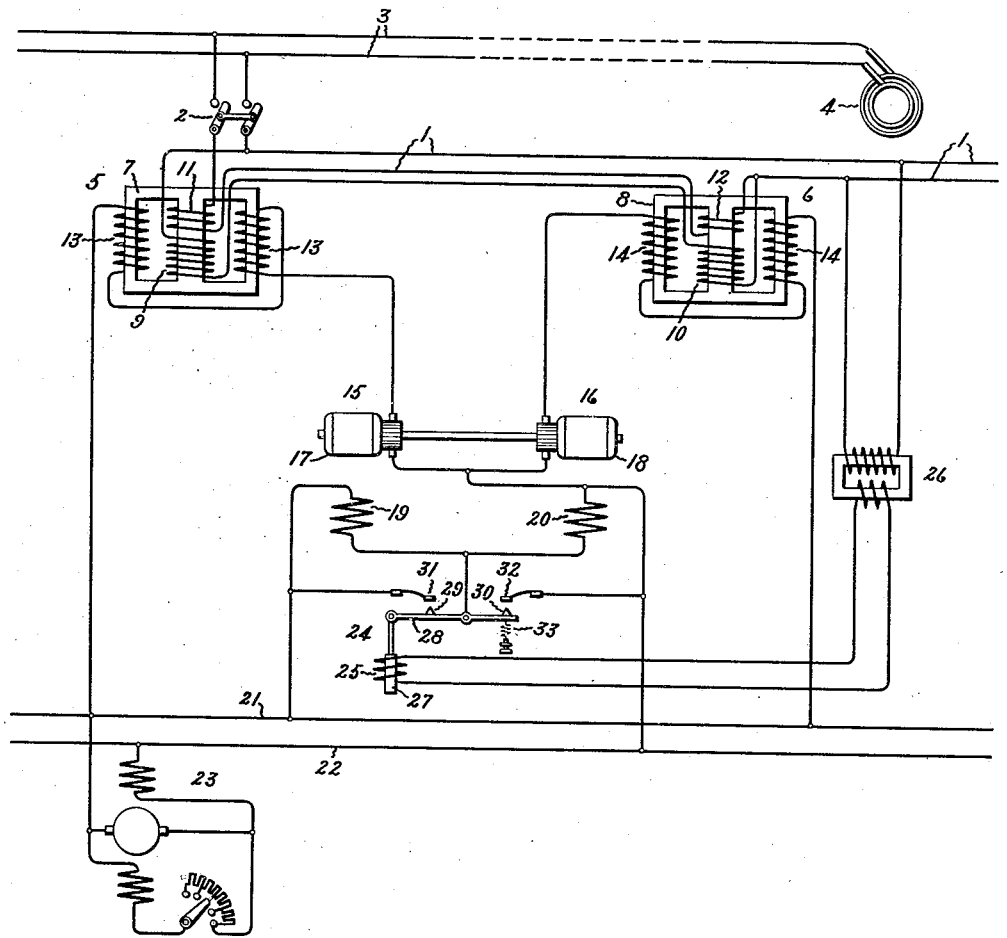

EDWIN J. MURPHY AND LOUIS W. THOMPSON, OF SCHENECTADY, NEW YORK, ASSIGNORS TO GENERAL ELECTRIC COMPANY, A CORPORATION OF NEW YORK.

REGULATING SYSTEM FOR ALTERNATING-CURRENT CIRCUITS.

1,337,942.  Specification of Letters Patent.  Patented Apr. 20, 1920.

Application filed July 10, 1918. Serial No. 244,164.

*To all whom it may concern:*

Be it known that we, EDWIN J. MURPHY and LOUIS W. THOMPSON, citizens of the United States, residing at Schenectady, county of Schenectady, State of New York, have invented certain new and useful Improvements in Regulating Systems for Alternating-Current Circuits, of which the following is a specification.

Our invention relates to regulating systems for alternating current circuits and has for its object the provision of a new and improved regulating system whereby regulation of an electrical condition of an alternating current circuit may be accomplished without the interruption of power currents and without the use of heavy moving parts, and whereby quick and sensitive regulation may be obtained.

If a unidirectional flux be developed in the magnetic core of a transformer having primary and secondary windings, the mutual induction between said windings and the self-induction thereof will be decreased to an extent dependent upon the value of such flux. Therefore, if the primary winding of the transformer be connected to a source of alternating current and the secondary winding thereof be connected in an alternating current circuit, the voltage of said circuit may be controlled by developing a unidirectional flux in the core of the transformer and regulating the value thereof. While it is preferable in regulating the operation of a transformer in this manner to develop in the core thereof a regulatable unidirectional flux, nevertheless the desired operation of the transformer may in a measure be accomplished by developing in the core a regulatable alternating flux having a lower frequency than the frequency of the alternating current circuit to be regulated. Since unidirectional flux and unidirectional current may be properly considered as flux and current of zero frequency, the expression "flux having a lower frequency than the frequency of said circuit" as used herein is intended to include a unidirectional flux as well as an alternating flux, while the expression "current having a lower frequency than the frequency of said circuit" is intended to include a unidirectional current as well as an alternating current. In accordance with our invention, therefore, we propose to regulate an electrical condition, such as the voltage, of an alternating current circuit by means of a regulating system comprising a transformer which is connected so as to modify the electrical condition being regulated, and means for developing in said transformer different amounts of flux having a lower frequency than the frequency of said source in order to vary the regulating effect of said transformer. The transformer may be connected so as to boost or buck the electrical condition being regulated or a plurality of transformers may be connected so that the range of regulation includes both boosting and bucking.

In accordance with one feature of our invention we propose to use a vibratory device responsive to an electrical condition of the alternating current circuit for controlling the amount of flux developed in said transformer, and means for preventing abrupt variations in said flux due to the action of said vibratory device so as to prevent fluctuations in the electrical condition being regulated.

In accordance with another feature of our invention we propose to employ a current regulating device in the primary circuit of the regulating transformer, so as to prevent an excessive current flowing through the primary circuit when the self induction of the primary winding of the transformer is small, due to the transformer core becoming saturated by means of the flux developed therein, but which is automatically varied so as not to limit the current when the self induction of the primary winding of the transformer is large.

Our invention may best be understood by reference to the following description considered in connection with the accompanying drawings, while the scope of our invention is defined in the appended claims.

Referring to the accompanying drawing consisting of a single figure, in which is diagrammatically shown one modification of our invention as applied to the regulation of a single phase alternating current circuit, 1 denotes an alternating current circuit adapted to be connected, by means of a switch 2, to the supply mains 3 leading from a single phase source of current 4. 5 and 6 denote transformers provided with magnetic cores 7 and 8, primary windings 9 and 10, secondary windings 11 and 12, and magnetizing windings 13 and 14, respectively. The primary windings 9 and 10 are connected in series with each other in a circuit connected in multiple with the circuit 1. The secondary windings 11 and 12 are connected in series with the circuit 1. The primary winding 9 and secondary winding 11 of the transformer 5 are so connected that when current is caused to flow in the winding 9 by the voltage of the circuit 1, the electromotive force induced in the secondary winding 11 will boost the voltage of the circuit 1. The primary winding 10 and secondary winding 12 of the transformer 6 are so connected that when current is caused to flow in the winding 10 by the voltage of the circuit 1 the electromotive force induced in the secondary winding 12 will buck the voltage of the circuit 1. The magnetizing winding 13, which is arranged on the core 7, and the magnetizing winding 14, which is arranged on the core 8, are each disposed so that voltages induced therein by the alternating flux in the core are substantially neutralized. As illustrated, this neutralization is accomplished by arranging equal portions of the winding 13 and of the winding 14 oppositely with respect to the alternating flux, although numerous other ways of accomplishing this result will be obvious to those skilled in the art. 15 and 16 denote counter electromotive force machines comprising armatures 17 and 18, preferably mounted on a common shaft, and field windings 19 and 20. The magnetizing winding 13 of the transformer 5 is connected in series with the armature 17 across the buses 21 and 22, which may be supplied with current from the direct current generator 23 or any other source of current having lower frequency than the frequency of circuit 1. Similarly the magnetizing winding 14 of the transformer 6 is connected in series with the armature 18 across the buses 21 and 22. 24 denotes a vibratory device comprising a winding 25 connected, by means of a potential transformer 26, to the circuit 1, a core 27 actuated by said winding 25, a movable arm 28 pivotally connected to said core 27, contacts 29 and 30 carried by said arm 28, and resiliently mounted stationary contacts 31 and 32 coöperating with the contacts 29 and 30. The field windings 19 and 20 are connected in series across the buses 21 and 22. The contacts 29 and 30 are electrically connected by means of the arm 28 to a point intermediate the field windings 19 and 20. The contacts 31 and 32 are connected to the buses 21 and 22 respectively. An adjustable spring 33 may be employed for adjusting the operation of the arm 28 of the vibratory device 24. The transformers 5 and 6 are designed and constructed to have sufficient boosting and bucking capacity to accomplish the desired regulation of the circuit 1 over the normal range of load thereon. The vibratory device 24 may be adjusted by means of the adjustable spring 33 so that, upon the voltage of the circuit 1 increasing above a predetermined desired value, the core 27 will be raised, thereby engaging contacts 29 and 31 and disengaging contacts 30 and 32, and, upon the voltage of the circuit 1 decreasing below said predetermined desired value, the core 27 will be lowered, thereby disengaging contacts 29 and 31 and engaging contacts 30 and 32.

The operation of our invention, as at present understood, is as follows:

Assume the switch 2 to be closed and the circuit 1 to be drawing current from the source 4. Also assume the direct current buses 21—22 to be energized from the generator 23 or other source. First suppose that the voltage of the circuit 1 is below the desired predetermined value. The core 27 will then be in its lower position so that the contacts 29 and 31 will be disengaged and the contacts 30 and 32 will be engaged. The field winding 19 will then be energized and the field winding 20 will be short circuited at the contacts 30—32 and hence be deënergized. The counter electromotive force machine 15 will therefore operate as a motor and both armatures 17 and 18 will be rotated. In the armature 17 there will be developed a counter electromotive force which will limit the current in the winding 13 to a relatively low value while in the armature 18 there will be developed very little, if any, counter electromotive force so that the current in the winding 14 will have a relatively high value. Under these conditions the secondary winding 11 of the transformer 5 will exert substantially its full boosting effect upon the circuit 1 whereas the secondary winding 12 of the transformer 6 will exert substantially no bucking effect upon the circuit 1 because with a low current in the winding 13 of the transformer 5 the mutual induction between the windings 9 and 11 thereof will be high whereas with a high current in the winding 14 of the transformer 6 the mutual induction between and the self induction of the windings 10 and 12 thereof will be low. An excessive current does not flow through the primary winding 10, due to the decrease in its self-induction, because the primary winding 9, the self-induction of which is high at this time, is connected in series therewith. Furthermore, it will be noted that the voltage impressed upon the primary winding 9 is approximately the voltage of the circuit 1, as the impedance of the primary winding 10 is small.

Now suppose that the voltage of the circuit 1 is above the said desired predetermined value. The core 27 will then be in its upper position so that the contacts 29 and 31 will be engaged and the contacts 30 and 32 will be engaged. The field winding 19 will then be short circuited at the contacts 29—31 and hence be deënergized and the field winding 20 will be energized. The counter electromotive machine 16 will therefore operate as a motor and both armatures 17 and 18 will be rotated. In the armature 18 there will be developed a counter electromotive force which will limit the current in the winding 14 to a relatively low value while in the armature 17 there will be developed very little, if any, counter electromotive force so that the current in the winding 13 will have a relatively high value. Under these conditions the secondary winding 11 of the transformer 5 will exert substantially no boosting effect upon the circuit 1 whereas the secondary winding 12 of the transformer 6 will exert substantially its full bucking effect upon the circuit 1 because with a high current in the winding 13 of the transformer 5 the mutual induction between and the self-induction of the windings 9 and 11 thereof will be low whereas with a low current in the winding 14 of the transformer 6 the mutual induction between the windings 10 and 12 thereof will be high.

It will be noted that the impedance of the primary winding 10 limits the amount of current flowing through the primary winding 9 and prevents it from becoming excessive, and that the voltage impressed upon the primary winding 10 is approximately equal to the voltage of the circuit 1. Therefore, it is evident, that this arrangement of connecting the primary windings of the transformers in series and simultaneously and inversely varying the current in the magnetizing windings of the transformers does away with the necessity of having to provide any extra apparatus for limiting the current through the primary winding of each transformer as would be the case if each primary winding were connected directly across the alternating current circuit. Furthermore, with this arrangement the full voltage of the alternating current circuit is impressed upon the primary winding of the particular transformer which, at any instant, is regulating the circuit. Obviously this would not be the case if each primary winding were connected directly across the alternating current circuit, and a current limiting device, having a constant impedance, were permanently inserted in the primary circuit of each transformer in order to limit the current therein when the transformer becomes saturated.

Although the action of the system when the voltage of the circuit 1 is above or below the desired predetermined value has been described it will be understood that the vibratory device 24 will normally be in rapid vibration and, through the regulation of the energization of the field windings 19 and 20 of the counter electromotive force machines 15 and 17, will cause the currents in the magnetizing windings 13 and 14 of the transformers 5 and 6 to have such relative values as to maintain the voltage of the circuit 1 substantially constant. The vibratory device 24 is designed and adjusted so that it is very sensitive to the conditions in circuit 1 and will, therefore, have a high rate of vibration. The counter electromotive force machines 15 and 16, which are interposed between the vibratory device 24 and the magnetizing windings 13 and 14 of the transformers 5 and 6, will prevent abrupt variations in the currents in the windings 13 and 14 corresponding to the individual vibrations of the vibratory device 24 but will regulate the currents in the windings 13 and 14 in accordance with the average effect of consecutive vibrations of the vibratory device. Since the vibratory device 24 is very sensitive to conditions in the circuit 1, the regulation of the circuit 1 will be sensitive and quick notwithstanding the interposition of the counter electromotive force machines 15 and 16 between the vibratory device 24 and the windings 13 and 14. Although the arrangement in which a counter electromotive force machine is interposed between a vibratory device and a regulating transformer is at present considered the preferred arrangement, nevertheless it will be understood that the vibratory device 24 may be made to control the currents in the windings 13 and 14 through intermediate apparatus other than counter electromotive force machines, which will likewise be effective to prevent objectionable fluctuations in the voltage of the circuit 1 due to the action of the vibratory device.

Although our invention is illustrated as applied to a single-phase alternating current circuit, it will be apparent to those skilled in the art how it may be applied to polyphase alternating current circuits.

While we have herein shown and described one modification of our invention, we do not desire to be limited to the exact arrangement shown and described but seek to cover in the appended claims all those modifications which come within the true spirit and scope of our invention.

What we claim as new and desire to secure by Letters Patent of the United States, is:—

1. The combination with an alternating current circuit of means for regulating an electrical condition of said circuit comprising a transformer connected to modify said electrical condition, and means for developing in said transformer different amounts of flux having a lower frequency than the frequency of said source, said last mentioned means comprising a vibratory device responsive to an electrical condition of said circuit, and means for preventing abrupt variations in said flux due to the action of said vibratory device.

2. The combination with an alternating current circuit of means for regulating an electrical condition thereof comprising a transformer connected thereto, a magnetizing winding for said transformer, and means for supplying to said magnetizing winding different values of current having a lower frequency than the frequency of said circuit, said means comprising a vibratory device responsive to an electrical condition of said alternating current circuit, and means for preventing abrupt variations in said magnetizing current due to the action of said vibratory device.

3. The combination with an alternating current circuit of means for regulating an electrical condition thereof comprising a transformer having primary and secondary windings, means for developing in said transformer a flux having a lower frequency than the frequency of said circuit, and means for regulating said flux comprising a vibratory device responsive to an electrical condition of said circuit and means for preventing abrupt variations in said flux due to the action of said device.

4. The combination with an alternating current circuit of means for regulating an electrical condition thereof comprising a transformer having a primary winding, a secondary winding and a magnetizing winding, means for supplying current having a lower frequency than the frequency of said circuit to said magnetizing winding, and means comprising a vibratory device, responsive to an electrical condition of said circuit, and means controlled thereby for regulating said current and for preventing abrupt variations therein due to the action of said device.

5. The combination with an alternating current circuit of means for regulating an electrical condition thereof comprising a transformer having a primary winding, a secondary winding and a magnetizing winding, means for supplying unidirectional current to said magnetizing winding, a counter electromotive force machine having an armature, connected in series with said magnetizing winding, and a field winding, and a vibratory device responsive to an electrical condition of said circuit for varying the energization of said field winding.

6. The combination with an alternating current circuit of means for regulating an electrical condition thereof comprising a transformer having its secondary winding connected in said circuit, a current limiting device connected in the primary circuit of said transformer, means for producing in said transformer a flux having a lower frequency than the frequency of said circuit to vary the mutual induction between primary and secondary windings of said transformer, and means for simultaneously and inversely varying said flux and the impedance of said current limiting device.

7. The combination with an alternating current circuit of means for regulating an electrical condition thereof comprising a transformer having its secondary winding connected in said circuit, a current limiting device connected in the primary circuit of said transformer, means for producing in said transformer a flux having a lower frequency than the frequency of said circuit to vary the mutual induction between primary and secondary windings of said transformer, and means responsive to an electrical condition of said circuit for simultaneously and inversely varying said flux and the impedance of said current limiting device.

8. The combination with an alternating current circuit, of means for regulating an electrical condition thereof comprising a plurality of transforming means having primary windings connected in series in a circuit connected in multiple with said alternating current circuit, secondary windings connected in series with said alternating current circuit; and magnetizing windings, means for supplying to said magnetizing windings current having a lower frequency than the frequency of said alternating current circuit, and means for simultaneously and inversely varying the currents in said magnetizing windings.

9. The combination with an alternating current circuit of means for regulating an electrical condition thereof, comprising boosting transforming means and bucking transforming means, each of said transforming means being provided with a winding connected in series with said circuit, a winding located in a circuit connected in multiple with said alternating current circuit, and a magnetizing winding, means for supplying to said magnetizing windings unidirectional current, and means responsive to an electrical condition of said alternating current circuit for simultaneously and inversely varying the currents in said magnetizing windings.

10. The combination with alternating current mains of means for regulating an electrical condition thereof comprising boosting transforming means and bucking transforming means, each of said transforming means being provided with a winding connected in series with said mains, a winding located in a circuit connected in multiple with said mains, and a magnetizing winding, said windings being so arranged that substantially no induced currents are caused to flow in said magnetizing windings, means for supplying direct current to said magnetizing windings, and means for controlling the relative values of the currents in said magnetizing windings comprising a counter electromotive force machine having a field winding and vibratory means responsive to an electrical condition of said circuit for varying the energization of said field winding.

11. The combination with alternating current mains of means for regulating an electrical condition thereof comprising boosting transforming means and bucking transforming means, each of said transforming means being provided with a winding connected in series with said mains, a winding located in a circuit connected in multiple with said mains, and a magnetizing winding, said windings being so arranged that substantially no induced currents are caused to flow in said magnetizing windings, means for supplying direct current to said magnetizing windings, means for controlling the relative values of the currents in said magnetizing windings comprising counter electromotive force machines having armatures, connected in series with said magnetizing windings, and field windings, and vibratory means responsive to an electrical condition of said circuit for varying the relative energization of said field windings.

In witness whereof, we have hereunto set our hands this 8th day of July, 1918.

EDWIN J. MURPHY.
LOUIS W. THOMPSON.